United States Patent
Schlenter et al.

(10) Patent No.: US 12,292,521 B2
(45) Date of Patent: May 6, 2025

(54) DETONATOR POSITION DETERMINATION

(71) Applicant: DETNET SOUTH AFRICA (PTY) LTD, Johannesburg (ZA)

(72) Inventors: Craig Schlenter, Johannesburg (ZA); Marinus Yates, Benoni (ZA)

(73) Assignee: DETNET SOUTH AFRICA (PTY) LTD, Johannesburg (ZA)

( * ) Notice: Subject to any disclaimer, the term of this patent is extended or adjusted under 35 U.S.C. 154(b) by 409 days.

(21) Appl. No.: 17/923,339

(22) PCT Filed: Apr. 23, 2021

(86) PCT No.: PCT/ZA2021/050024
§ 371 (c)(1),
(2) Date: Nov. 4, 2022

(87) PCT Pub. No.: WO2021/222948
PCT Pub. Date: Nov. 4, 2021

(65) Prior Publication Data
US 2023/0194733 A1    Jun. 22, 2023

(30) Foreign Application Priority Data
Apr. 29, 2020   (NA) .................. NA/P/2020/0012

(51) Int. Cl.
*G01S 19/51*   (2010.01)
*F42D 1/055*   (2006.01)

(52) U.S. Cl.
CPC .............. *G01S 19/51* (2013.01); *F42D 1/055* (2013.01)

(58) Field of Classification Search
CPC .................................. G01S 19/51; F42D 1/055
See application file for complete search history.

(56) References Cited

U.S. PATENT DOCUMENTS

| | | | | |
|---|---|---|---|---|
| 6,079,333 A | * | 6/2000 | Manning | F42D 1/05 102/420 |
| 6,941,870 B2 | | 9/2005 | McClure et al. | |
| 7,650,841 B2 | * | 1/2010 | McClure | F42D 1/055 102/311 |

(Continued)

FOREIGN PATENT DOCUMENTS

| | | |
|---|---|---|
| CA | 2423936 A1 | 3/2003 |
| EP | 1325282 B1 | 8/2007 |
| EP | 1690063 B1 | 2/2009 |

OTHER PUBLICATIONS

International Preliminary Report on Patentability for PCT/ZA2021/050024, international filing date of Apr. 23, 2021, date of completion Nov. 23, 2021, 10 pages.

(Continued)

*Primary Examiner* — Peter M Bythrow
*Assistant Examiner* — Nazra Nur Waheed
(74) *Attorney, Agent, or Firm* — CANTOR COLBURN LLP

(57) ABSTRACT

In a blasting system a method of determining which borehole in a plurality of boreholes at a blast site is closest to a tagger, wherein latitude and longitude coordinate values for each borehole are determined and by using subsets of the longitude coordinates and latitude coordinates, and by performing a haversine calculation the position of the borehole which is closest to the tagger is determined.

2 Claims, 2 Drawing Sheets

(56) References Cited

U.S. PATENT DOCUMENTS

2004/0225431 A1 11/2004 Aebi et al.
2017/0328682 A1* 11/2017 Smith .................... F41G 7/308

OTHER PUBLICATIONS

International Search Report for PCT/ZA2021/050024, international filing date of Apr. 23, 2021, date of mailing Jul. 27, 2021, 4 pages.
Written Opinion for PCT/ZA2021/050024, international filing date of Apr. 23, 2021, date of mailing Jul. 27, 2021, 6 pages.

* cited by examiner

DETONATOR POSITION DETERMINATION

CROSS-REFERENCE TO RELATED APPLICATIONS

This application is a U.S. national stage application of International Application No. PCT/ZA2021/050024 entitled "DETONATOR POSITION DETERMINATION", which has an international filing date of 23 Apr. 2021, and which claims priority to Namibian Patent Application No. NA/P/2020/0012, filed 29 Apr. 2020.

BACKGROUND OF THE INVENTION

This invention relates to a blasting system, and to a method of determining the position of a detonator in a blasting system.

A blasting system which is implemented on a large scale can include a substantial number of detonators, by way of example up to about sixteen thousand, and can extend over a significant ground area. The effective programming of time delays in the various detonators can present a formidable task. Also an operator using a tagger on the blast site may find it difficult to identify one blast hole from another. Another aspect is that a large site should not be treated as having a planar or two-dimensional surface and that, to improve the accuracy of time delays which are to be assigned to the respective detonators, the curvature of the earth should be taken into account.

U.S. Pat. No. 6,941,870 relates to a blasting system which makes use of a GPS as a positional detecting device. Blasting information is automatically determined as a function of the distance and direction of movement of the device to a particular detonator. A typical GPS has an accuracy of about 10 meters and, inherently, this limits the accuracy of a timing delay which is to be assigned to a particular detonator. Even if this aspect can be addressed there remains a practical problem in a system which includes a large number of detonators of enabling an operator at a blast site to generate positional data rapidly and with a high degree of accuracy. One approach to this problem is to calculate the distance between the tagger and each of the detonators in order to find a detonator which is closest to the tagger. If there are thousands of detonators then the calculation exercise places a heavy demand on a processor and can interrupt functional aspects of the tagger such as display and control matters.

An object of the present invention is to address, at least to some extent, the aforementioned problem.

SUMMARY OF THE INVENTION

The invention provides a method of determining which detonator in a plurality of detonators at a blast site is closest to an operator who has a tagger, wherein the blast site has a plurality of boreholes each of which is associated with at least one respective detonator, the method including the steps of providing a reference GPS receiver which includes a transmitter which is located at the blast site, linking or associating the tagger to at least one roving GPS receiver which is movable by the operator at the blast site and which receives positional data corrections from the transmitter at the reference GPS receiver, coupling the roving GPS receiver to a database which includes a tagging plan which contains positional data for each of the boreholes at the blast site, wherein said positional data includes respective coordinate values for each borehole, and using said coordinate values and said positional data corrections to determine the position of a detonator which is closest to the tagger.

The coordinates may be in any reference system but for the purposes of this specification the coordinates are in latitude and longitude. This however is exemplary only and non-limiting for a person skilled in the art could readily implement the method using a different coordinate reference system.

The tagging plan may be at any convenient location. It may be derived from earlier measurements which are independently made, or it may be generated while the method of the invention is being implemented. Other techniques or processes can also be used.

The method may include the steps of creating a latitude index for the latitude values, creating a longitude index for the longitude values, sorting the latitude index into a desired sequence, for example, from the smallest latitude value to the largest latitude value, sorting the longitude index into a desired sequence, for example, from the smallest longitude value to the largest longitude value, and at a given location of the tagger at the blast site using the roving GPS receiver to determine current tagger latitude and current tagger longitude values.

Any suitable search, e.g. a binary search, may be used with the current tagger latitude value, to determine the position of that latitude value within the latitude index. Similarly by using any suitable search technique e.g. a binary search, and by using the current tagger longitude value the position of that longitude value within the longitude index can be determined. In each case the respective position found within the index is termed the "insertion point". The insertion points may differ from the current latitude and longitude values of the tagger, and are therefore referred to as "the latitude insertion point" and "the longitude insertion point" respectively.

The method may then include the steps, using the respective insertion points, of creating a latitude subset, from the latitude index, wherein the difference between each of the latitude values in the latitude subset and the current tagger latitude value is less than a first predetermined amount, creating a longitude subset from the longitude index wherein the difference between each of the longitude values in the subset and the current tagger longitude value is less than a second predetermined amount, sorting the latitude values in the latitude subset for example from the smallest to the largest, sorting the longitude values in the longitude subset for example from the smallest to the largest, generating an intersection of the latitude subset with the longitude subset, identifying each of the boreholes whose latitude and longitude values are included in the intersection, and for each such borehole performing a haversine calculation using the respective latitude value and longitude value for the borehole and the current tagger latitude value and the current tagger longitude value to determine the distance between the tagger and the borehole, and selecting from such distance calculations the smallest value to obtain the position of the borehole which is closest to the tagger.

BRIEF DESCRIPTION OF THE DRAWINGS

The invention is further described by way of example with reference to the accompanying drawings in which.

DESCRIPTION OF PREFERRED EMBODIMENT

Figure 1:
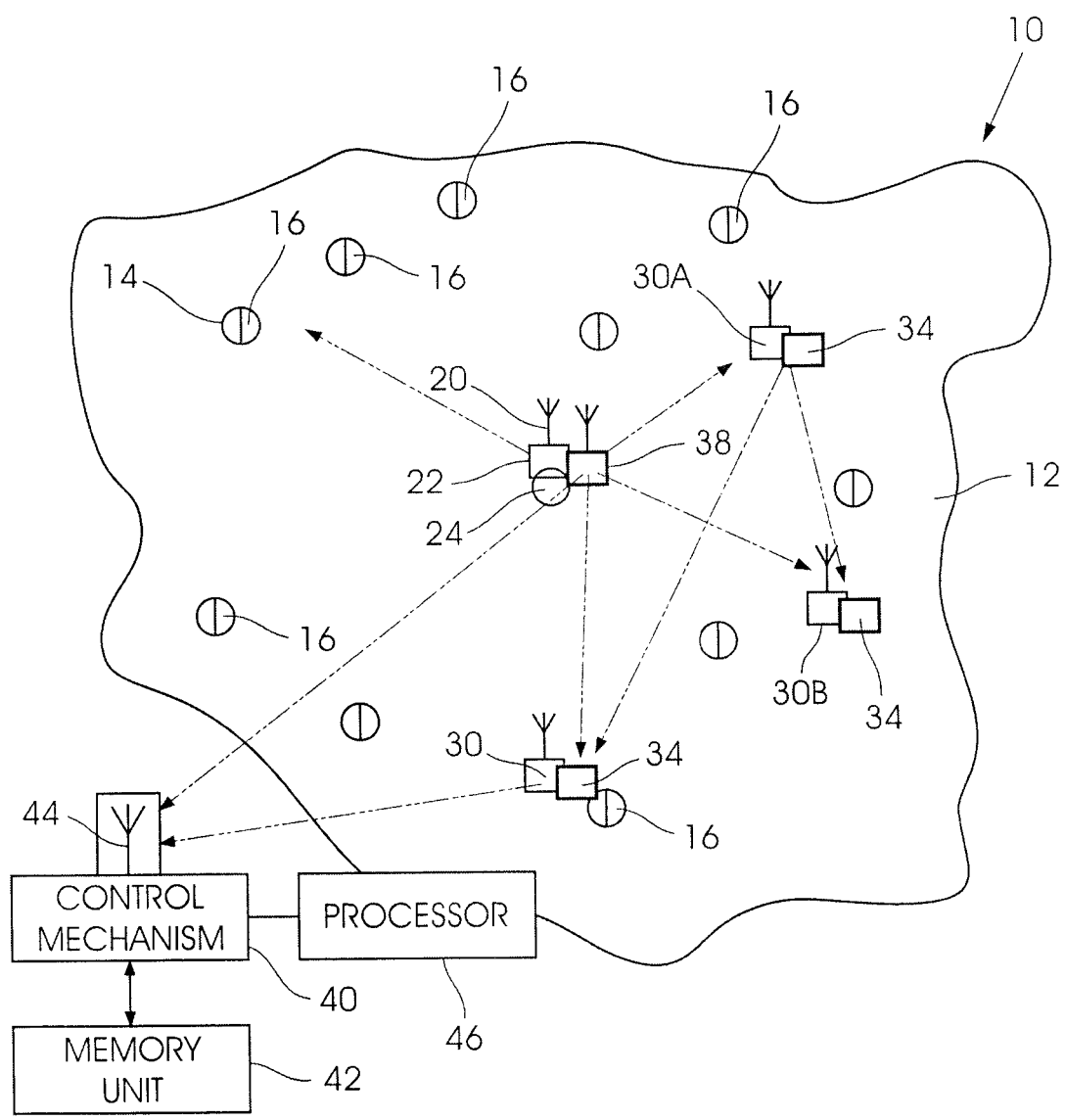
FIG. 1 schematically depicts a blasting system established at a blast site.

FIG. 1 of the accompanying drawings schematically depicts a blasting system 10 which is established at a blast site 12.

The blast site 12 typically extends over a large area and includes a large number of boreholes 14, possibly of the order of several thousand. Each borehole 14 includes at least one respective detonator 16.

If the boreholes 14 are drilled by means of automated or autonomous drilling machines then the geographical position of each borehole, in terms of longitude and latitude coordinates, is known with an acceptable degree of accuracy. Despite this it can be difficult for an operator using a tagger to establish where, on the blast site, the operator is.

In some instances automated drill rigs are not used. As a consequence a plan which accurately reflects the positions of the boreholes might not be available.

If the blast site 12 extends over a large area then the curvature of the earth must be taken into account if the position of each borehole is to be accurately determined i.e. it is not acceptable to view the blast site as a planar or two-dimensional site.

In order to obtain accurate data relating to the position of each borehole 14 a differential GPS system is employed. Use is made of a base or reference antenna 20 which is positioned at a known location 22 on the blast site. Preferably the known location 22 is a borehole 24 selected from the plurality of boreholes 14. This however is not essential for a reference location 22 can be selected using other criteria. The use of a selected borehole 24 has the benefit that any offset or error related to recording the position of the borehole 24 is mitigated as the positions of the remaining boreholes are frequently determined using a reference system which is based on the relative positions of the boreholes.

A number of roving GPS receivers 30, 30A, 30B etc. can be used at the blast site. Each roving GPS receiver is associated with a respective tagger 34 and is carried by a respective operator, not shown, who traverses the blast site. The taggers can communicate with each other using transceivers and can also communicate with a reference GPS receiver 38 associated with the base antenna 20 at the reference location 22.

The blasting system 10 also includes a control mechanism 40, positioned at any appropriate location, which includes a memory storage unit 42, a communication facility 44, and a processor 46.

If the boreholes 14 are drilled at precisely determined locations using, for example, automated drill rigs then the geographical coordinates (longitude and latitude values) of each borehole (i.e. the blast plan) are usually known with an acceptable degree of accuracy. That data is collected at the time of borehole drilling and is stored in the memory unit 42.

A GPS receiver typically works with an accuracy of, say, ten meters but, apart therefrom, signals to the GPS receiver can be adversely affected by various physical factors. To address these aspects use is made of a differential GPS approach in that the reference GPS receiver 38 is in communication with the base antenna 20 at the reference location 22. The coordinates of the reference location 22 are known from the data held in the memory unit 42.

When a roving GPS receiver 30, plus an associated tagger 34, traverses the blast site 12, the operator positions the roving GPS receiver directly over a selected borehole 14 and determines the GPS coordinates of that borehole. Correction positional data from the reference GPS receiver 38 is transmitted, continuously or as required, to each roving GPS receiver 30. The correction data transmitted in this way is applied in real time to correct the positional data in the GPS receiver 30 so that the longitude and latitude values of the borehole 14, are determined with an acceptable degree of accuracy. The positional data values so determined are transmitted by the GPS receiver 30 in question to the other roving GPS receivers (30A, 30B, . . . ) and to the control mechanism 40. Thus, at all times each GPS receiver 30 and associated tagger 34 carry the same information as the other roving GPS receivers and associated taggers and that information is replicated at the control mechanism 40. At the control mechanism the processor 46, using the corrected positional data, calculates the timing delays associated with the detonators 16 which are to be placed in the respective boreholes 24.

It is possible for a tagging plan generated by blast software located for example at the control mechanism 40 to be downloaded to each roving GPS receiver 30 and associated tagger 34. The tagger then calculates the closest boreholes and preselects the holes based on the distances to those holes.

If accurate positional data is not available from the memory unit 42 relating to the positions of the boreholes, for example if automated drill rigs were not used in the drilling of the boreholes 14, then each tagger 34 may have an on-board capability to create a location-accurate plan of the blast site. This can be achieved when the operator walks to each borehole 14 and adds that borehole to the geographical plan. As indicated this positional data corrected using the data from the reference GPS receiver 38, is transferred to all other taggers in the system and to the control mechanism 40.

Once all the boreholes have been tagged in the described manner the control mechanism 40 calculates the timing delays for the respective detonators which are to be placed in the boreholes and this timing data is transmitted to each of the taggers. The detonators 16 can then be programmed as appropriate in order to implement the blasting system.

Figure 2:
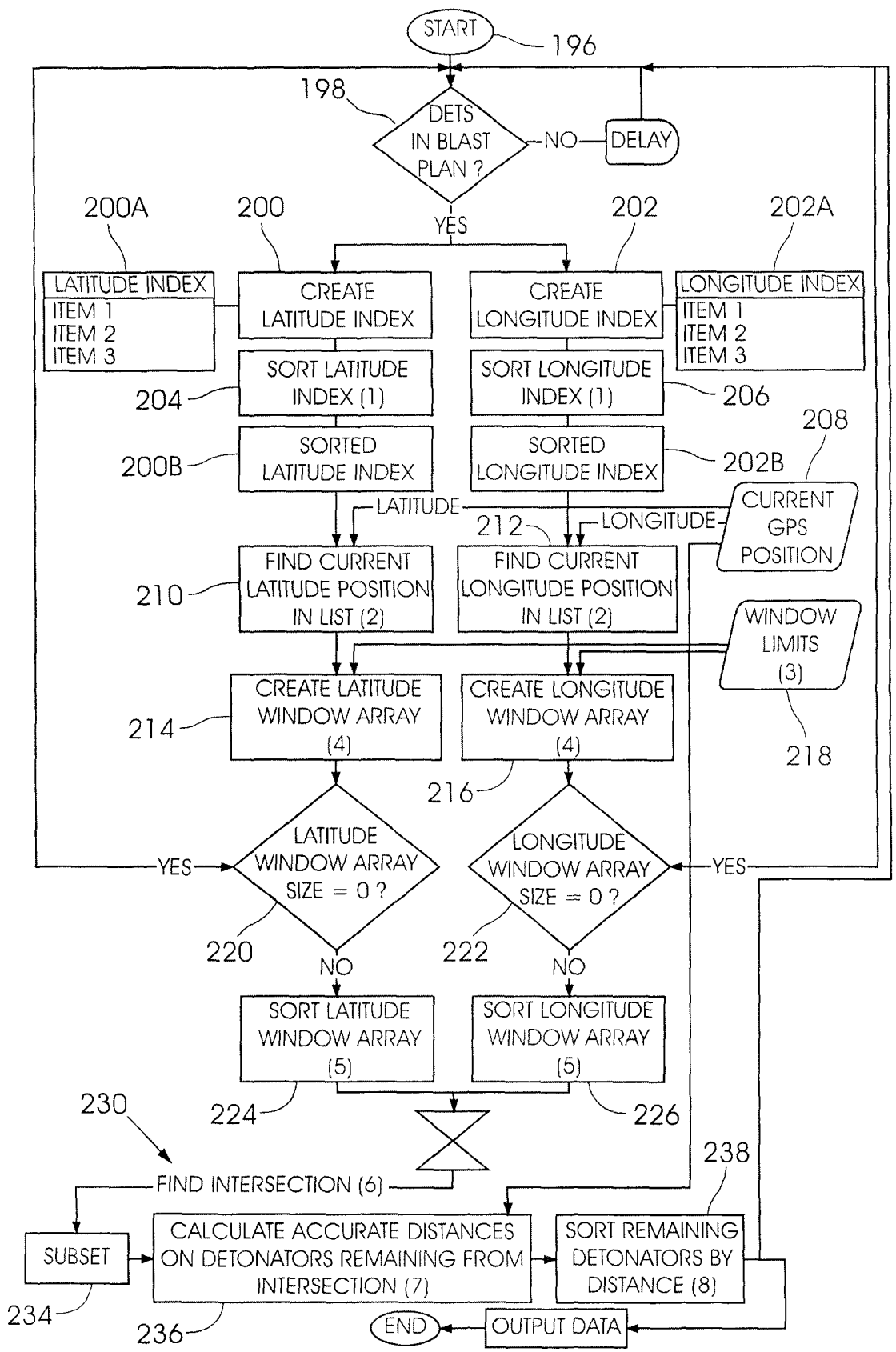
FIG. 2 is a flowchart of a calculation process implemented to locate a borehole (at the blast site) and hence a detonator, which is closest to a tagger.

If the blast site 12 includes a large number of boreholes 14 and, particularly if the blast site extends over a large area, then it can be problematic for an operator to determine which borehole 14 is closest to him at any particular time. Calculations can be done of the distance between each borehole 14 and the tagger 34 carried by the operator but such calculations can call for significant processing time and meaningful computational resources. To address this aspect the roving GPS receiver 30 and the associated tagger 34 are used to implement a method according to the invention to determine which borehole 14 is closest to the tagger 34. The manner in which this is done is shown in FIG. 2 with the method commencing at a starting point 196.

The coordinate values i.e. the latitude and longitude values for boreholes 14 which have been drilled, are known (198) from the blast plan. In steps 200 and 202 an index 200A is created for the latitude values and an index 202A is created for the longitude values. The latitude index 200A is sorted (step 204) to create a second latitude index 200B ranging from the smallest latitude value to the largest latitude value and, similarly, in a step 206, the longitude index 202A is sorted to create a second longitude index 202B ranging from the smallest longitude value to the largest longitude value.

For a given tagger 34 a GPS reading (208) is taken of the current tagger latitude value and of the current tagger longitude value. A binary search is then done on the sorted latitude index 200B, to establish where, within the latitude index 200B, the tagger latitude value is (step 210). This gives a point referred to as the "latitude insertion point". Similarly, a binary search is done to establish where, within the longitude index 202B, the tagger longitude value is (step 212). This gives a point referred to as the "longitude insertion point".

A latitude window array subset 214 is then created for the latitude values, and a longitude window array subset 216 is created for the longitude values. In the latitude index 200B the latitude values are examined, in sequence from the latitude insertion point, to determine those latitude values which do not differ by more than X decimal degrees from the current tagger latitude value. These index values, for which the latitude values are less than X decimal degrees, are entered into the latitude window array subset 214. The window limit of X decimal degrees is set via a suitable input 218 to the tagger 34.

Similarly, in the longitude index 202B the longitude values are examined in sequence from the longitude insertion point to ascertain those longitude values which do not differ by more than Y decimal degrees from the current tagger longitude value. These index values, for which the longitude values are less than Y decimal degrees, are entered into the longitude window array subset 216. The Y limit can be set according to requirement via the input 218. Also Y can be equal to X. If no index values are to be entered into the latitude window array subset 214 (step 220) the processing sequence is returned to the starting point 196. Similarly, if no index values are to be entered into the latitude window array subset 214, the processing sequence is returned to the starting point 196.

The values of X and of Y are set by an operator who takes into account at least the number of the boreholes 14 at the site 12, and the density of the boreholes i.e. the number of boreholes per unit area.

In a step 224 the latitude values within the latitude window array subset 214 are sorted from the smallest value to the largest value. Similarly, in a step 226 the longitude values within the longitude window array subset 216 are sorted from the smallest value to the largest value.

In a subsequent step 230 the intersection of the sorted latitude window array subset 214 with the sorted longitude window array subset 216 is ascertained. That intersection produces a subset 234 which encompasses the coordinates of the boreholes, and hence of the detonators (in the latitude window array subset and in the longitude window array subset) which are within X decimal degrees of the current tagger latitude value and within Y decimal degrees of the current tagger longitude value.

A haversine calculation 236 of the tagger's current position relative to the positions of the boreholes within the intersection subset 234 is then carried out. This gives the distance from the tagger to each borehole in the subset 234 and thus, by implication, to each of the detonators in the respective boreholes. The distances are sorted from the smallest distance to the largest distance (step 238). The smallest distance then identifies the borehole 14 and hence the detonator 16, which is closest to the tagger 34.

The invention claimed is:

1. A method of determining which detonator in a plurality of detonators at a blast site is closest to an operator who has a tagger, wherein the blast site has a plurality of boreholes each of which is associated with at least one respective detonator, the method including the steps of providing a reference GPS receiver which includes a transmitter which is located at the blast site, linking the tagger to at least one roving GPS receiver which is movable by the operator at the blast site and which receives positional data corrections from the transmitter at the reference GPS receiver, coupling the roving GPS receiver to a database which includes a tagging plan which contains positional data for each of the boreholes at the blast site, wherein said positional data includes respective latitude and longitude coordinate values for each borehole, and using said coordinate values and said positional data corrections to determine the position of a detonator which is closest to the tagger, characterized in that the method includes the further steps of creating a latitude index for the latitude values, creating a longitude index for the longitude values, sorting the latitude index into a desired sequence, sorting the longitude index into a desired sequence, at a given location of the tagger at the blast site, using the roving GPS receiver to determine current tagger latitude and current tagger longitude values, creating a latitude subset, from the latitude index, wherein the difference between each of the latitude values in the latitude subset and the current tagger latitude value is less than a first predetermined amount, creating a longitude subset from the longitude index wherein the difference between each of the longitude values in the subset and the current tagger longitude value is less than a second predetermined amount, sorting the latitude values in the latitude subset, sorting the longitude values in the longitude subset, generating an intersection of the latitude subset with the longitude subset, identifying each of the boreholes whose latitude and longitude values are included in the intersection and for each such borehole performing a haversine calculation using the respective latitude value and longitude value for the borehole and the current tagger latitude value and the current tagger longitude value to determine the distance between the tagger and the borehole, and selecting from such distance calculations the smallest value to obtain the position of the borehole which is closest to the tagger.

2. A method according to claim 1 wherein the latitude values are sorted from the smallest latitude value to the largest latitude value and the longitude values are sorted from the smallest longitude value to the largest longitude value.

* * * * *